United States Patent
He et al.

(10) Patent No.: US 12,125,142 B2
(45) Date of Patent: Oct. 22, 2024

(54) METHODS AND SYSTEMS FOR MODELING POOR TEXTURE TUNNELS BASED ON VISION-LIDAR COUPLING

(71) Applicant: TONGJI UNIVERSITY, Shanghai (CN)

(72) Inventors: Bin He, Shanghai (CN); Gang Li, Shanghai (CN); Runjie Shen, Shanghai (CN); Bin Cheng, Shanghai (CN); Zhipeng Wang, Shanghai (CN); Ping Lu, Shanghai (CN); Zhongpan Zhu, Shanghai (CN); Yanmin Zhou, Shanghai (CN); Qiqi Zhu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 233 days.

(21) Appl. No.: 17/808,117

(22) Filed: Jun. 22, 2022

(65) Prior Publication Data
US 2023/0087467 A1    Mar. 23, 2023

(30) Foreign Application Priority Data
Aug. 17, 2021   (CN) .......................... 202110939893.6

(51) Int. Cl.
*G06T 17/05*    (2011.01)
*B64C 39/02*    (2023.01)
(Continued)

(52) U.S. Cl.
CPC ............ *G06T 17/05* (2013.01); *B64C 39/024* (2013.01); *B64U 20/87* (2023.01); *G01C 21/165* (2013.01);
(Continued)

(58) Field of Classification Search
None
See application file for complete search history.

(56) References Cited

U.S. PATENT DOCUMENTS

| 10,732,647 B2 * | 8/2020 | Shen .................... G01C 21/206 |
| 2015/0269438 A1 * | 9/2015 | Samarasekera .... G01C 21/3848 |
| | | 382/154 |

(Continued)

FOREIGN PATENT DOCUMENTS

| CN | 109945856 A | * | 6/2019 |
| CN | 114723902 A | * | 7/2022 |

(Continued)

OTHER PUBLICATIONS

Machine translation of DE-102014211721-A1 (Year: 2015).*
Machine translation of CN-109945856-A (Year: 2019).*
Machine translation of CN-114723902-A (Year: 2022).*

*Primary Examiner* — Hussein Elchanti
*Assistant Examiner* — Kenneth M Dunne
(74) *Attorney, Agent, or Firm* — Hongyu Wang

(57) ABSTRACT

The method includes: obtaining point cloud information collected by a depth camera, laser information collected by a lidar, and motion information of an unmanned aerial vehicle (UAV); generating a raster map based on the laser information, and obtaining pose information of the UAV based on the motion information; obtaining a map model through fusing the point cloud information, the raster map, and the pose information by a Bayesian fusion method; and correcting a latest map model by feature matching based on a previous map model.

16 Claims, 3 Drawing Sheets

(51) Int. Cl.
  *B64U 20/87* (2023.01)
  *B64U 101/30* (2023.01)
  *G01C 21/16* (2006.01)
  *G01S 17/86* (2020.01)
  *G01S 17/89* (2020.01)
  *G05D 1/00* (2024.01)
  *G06T 7/73* (2017.01)
  *G06T 19/20* (2011.01)

(52) U.S. Cl.
  CPC .............. *G01S 17/86* (2020.01); *G01S 17/89* (2013.01); *G05D 1/106* (2019.05); *G06T 7/74* (2017.01); *G06T 7/75* (2017.01); *G06T 19/20* (2013.01); *B64U 2101/30* (2023.01); *G06T 2207/10028* (2013.01); *G06T 2207/10032* (2013.01); *G06T 2207/30181* (2013.01); *G06T 2219/2016* (2013.01)

(56) References Cited

U.S. PATENT DOCUMENTS

2017/0242109 A1* 8/2017 Dussan .................. G01S 17/42
2018/0290748 A1* 10/2018 Corban ................ G05D 1/0088
2019/0049962 A1* 2/2019 Ouellette ................ G01S 17/89
2020/0072613 A1* 3/2020 Kuzmanovic ........... G06T 17/05
2021/0129987 A1* 5/2021 Foong .................... B64U 20/87

FOREIGN PATENT DOCUMENTS

DE      102014211721 A1 * 12/2015  ............. B64C 25/32
WO      WO-2020014740 A1 *  1/2020  ........... B64C 39/024

* cited by examiner

300

Determining data quality of data corresponding to each preset area in the tunnel through processing the point cloud information, the laser information, and the motion information by a data quality judgment model
302

Controlling the UAV to obtain the data based on the data quality and the constructed map model
304

FIG. 3

METHODS AND SYSTEMS FOR MODELING POOR TEXTURE TUNNELS BASED ON VISION-LIDAR COUPLING

CROSS-REFERENCE TO RELATED DISCLOSURES

This application claims priority to Chinese Patent Application No. 202110939893.6, filed on Aug. 17, 2021, the contents of which are hereby incorporated by reference.

TECHNICAL FIELD

The present disclosure relates to the technical field of unmanned aerial vehicle (UAV) tunnel modelling, and in particular to a method and a system for modelling a poor texture tunnel based on a vision-lidar coupling.

BACKGROUND

The maintenance and modelling of tunnels is an essential part of geological engineering safety, which is related to normal operation of the whole geological engineering. Conventional tunnel modelling methods generally need to collect data information in a tunnel first through using an unmanned aerial vehicle (UAV) to collect data information in narrow areas where a person can't enter, and then use a 3D modelling software to convert the data information into a 3D model. However, in the absence of tunnel texture, it is very difficult to collect the data information. In addition, in some narrow and dark areas, information collection and modelling are increasingly difficult. The quality of 3D modelling completely depends on information collected in situ, so this method is likely to lead to a big gap between modelling and an actual scene, and the accuracy of modelling according to this method needs to be improved.

Simultaneous localization and mapping (SLAM) refers to a body equipped with specific sensors, such as a robot and an UAV system, which may estimate its posture in an unknown environment and build a map of surrounding environment at the same time. The SLAM is mainly used to solve the problems of positioning and navigation and mapping of mobile robots in unknown environments. The SLAM algorithms are mainly used for modelling tunnels by the UAVs. The SLAM algorithms include visual SLAM, laser SLAM, etc, the basic principle of which is to estimate a pose and build a map by matching feature points in adjacent frames. In a tunnel environment lack of texture and high picture repeatability, the accuracy of modelling needs to be improved.

SUMMARY

The objective of the disclosure is to provide a method and a system for modelling a poor texture tunnel based on a vision-lidar coupling to overcome defects of the prior art, which integrate a depth camera and a lidar for SLAM mapping, fully utilize of wide range information of the lidar and abundant local information of the depth camera, complementarily improve the accuracy of information, and make the construction of a map model closer to the real tunnel environment.

One aspect of some embodiment of the present disclosure provides a method for modelling a poor texture tunnel based on a vision-lidar coupling, which uses an unmanned aerial vehicle (UAV) equipped with a depth camera and a lidar for modelling, and includes the following steps: S1, obtaining point cloud information collected by the depth camera, laser information collected by the lidar, and motion information of the UAV; S2, generating a raster map through filtering the laser information and obtaining pose information of the UAV based on the motion information; S3, obtaining a map model through fusing the point cloud information, the raster map, and the pose information by a Bayesian fusion method; and S4, obtaining a new map model by repeating the S1 to the S3, correcting a latest map model by feature matching based on a previous map model, and repeating S4 until completing construction of the map model.

In some embodiments, before the S1, the method further includes determining a relative transformation relationship between the point cloud information and the laser information according to a position relationship between the depth camera and the lidar on the UAV.

In some embodiments, the transformation relationship of point cloud from a lidar coordinate system to a depth camera coordinate system is as follows:

$$\begin{pmatrix} X_c \\ Y_c \\ Z_c \end{pmatrix} = r \begin{pmatrix} X \\ Y \\ Z \end{pmatrix} + t$$

$$\begin{pmatrix} u \\ v \\ 1 \end{pmatrix} = K \begin{pmatrix} \frac{X_c}{Z_c} \\ \frac{Y_c}{Z_c} \\ 1 \end{pmatrix},$$

where $(X, Y, Z)^T$ represents coordinates in the lidar coordinate system, $(X_c, Y_c, Y_c)^T$ represents coordinates in the depth camera coordinate system, $(u, v, 1)^T$ represents pixel coordinates on an imaging plane of the depth camera, r is a rotation matrix determined based on the positions of the depth camera and the lidar on the UAV, t is a translation matrix determined based on the positions of the depth camera and the lidar on the UAV, and K represents an intrinsic parameter matrix of the depth camera.

In some embodiments, the motion information of the UAV includes a speed, an acceleration, and a distance, which is measured by an inertial measurement unit (IMU) and an odometer; and in the S2, the pose information of the UAV is obtained through fusing the motion information by Kalman filter.

In some embodiments, in the S4, the correcting a latest map model by feature matching based on a previous map model specifically includes: S41, obtaining the previous map model as a reference frame; acquiring the latest map model, and finding an area corresponding to the previous map model from the latest map model as a current frame; S42, denoting feature points in the reference frame by {Pi}, and denoting feature points in the current frame by {Qi}, and a number of feature points in the current frame is the same as that in the reference frame; S43, constructing an interframe change model: {Qi}=R{Pi}+T, where R represents a rotation parameter and T represents a translation parameter; S44, substituting the feature points in the reference frame and the feature points in the current frame, and iteratively calculating the rotation parameters and the translation parameters; and S45, obtaining a matching relationship between the previous map model and the latest map model based on the rotation parameters and the translation parameters, and correcting the latest map model based on the matching relationship.

In some embodiments, in the S44, the iteratively calculating the rotation parameters and the translation parameters specifically includes: substituting the feature points in the reference frame and the feature points in the current frame into the inter-frame change model, establishing an objective function based on the inter-frame change model, and letting a function value of the objective function take a minimum rotation parameter and a minimum translation parameter, which are the final calculated rotation parameter and translation parameter; a formula of the objective function is:

$$L = \sum_{i=1}^{N} |q_i - (Rp_i + T)|^2,$$

where L represents the function value of the objective function, pi represents a feature point in the reference frame, qi represents a feature point in the current frame, and N represents the number of feature points.

In some embodiments, the motion information includes positioning information determined based on reference signals sent by one or more positioning UAVs.

In some embodiments, before acquiring the reference signals, the method further includes: based on a difference between feature points and adjacent pixel points in a depth image acquired by the depth camera, determining a matching reliability of the depth image; and based on the matching reliability, controlling the one or more positioning UAVs to send out the reference signals.

In some embodiments, when the positioning UAV sends out reference signals, the positioning UAV is kept in a stable state by a fixing device arranged on the UAV.

In some embodiments, the method further includes: when collecting the point cloud information by the depth camera, lighting a collection environment by using an auxiliary UAV.

In some embodiments, the method further includes: processing the point cloud information, the laser information and the motion information by a data quality judgment model to determine the data quality of data corresponding to each preset area in the tunnel; and based on the data quality and the constructed map model, controlling the UAV to acquire data.

In some embodiments, the step of based on the data quality and the constructed map model, controlling the UAV to acquire data includes: when using the UAV to acquire data, using the auxiliary UAV to light the collection environment; and using one or more positioning UAVs to send out reference signals.

Another aspect of some embodiment of the present disclosure provides a system for modelling a poor texture tunnel based on a vision-lidar coupling. The system includes an unmanned aerial vehicle (UAV) body, on which a depth camera, a lidar, a computing unit and a controller are mounted; the controller is in communication with the depth camera, the lidar and the computing unit, and the system performs the following steps during a flight of the UAV: T1, obtaining point cloud information collected by the depth camera, laser information collected by the lidar and motion information of the UAV and sending the point cloud information, laser information, and motion information to the computing unit by the controller; T2, generating a raster map through filtering the laser information and obtaining pose information of the UAV based on the motion information by the computing unit; T3, obtaining a map model through fusing the point cloud information, the raster map, and the pose information by a Bayesian fusion method; and T4, obtaining a new map model by repeating the T1 to the T3, correcting a latest map model by feature matching based on a previous map model, and repeating T4 until completing construction of the map model.

In some embodiments, in the T4, the correcting a latest map model by feature matching based on a previous map model specifically includes: T41, obtaining the previous map model as a reference frame; obtaining the latest map model, and finding an area corresponding to the previous map model from the latest map model as a current frame; T42, denoting feature points in the reference frame by {Pi}, and denoting feature points in the current frame by {Qi}, and a the number of feature points in the current frame is the same as that in the reference frame; T43, constructing an inter-frame change model: {Qi}=R{Pi}+T, where R represents a rotation parameter and T represents a translation parameter; T44, substituting the feature points in the reference frame and the feature points in the current frame, and iteratively calculating the rotation parameters and the translation parameters; and T45, obtaining a matching relationship between the previous map model and the latest map model based on the rotation parameters and the translation parameters, and correcting the latest map model based on the matching relationship.

In some embodiments, in the T44, the iteratively calculating the rotation parameters and the translation parameters specifically includes: substituting the feature points in the reference frame and the feature points in the current frame into the inter-frame change model, establishing an objective function based on the inter-frame change model, and defining a function value of the objective function take a minimum rotation parameter and a minimum translation parameter, which is the final calculated rotation parameter and translation parameter; a formula of the objective function is:

$$L = \sum_{i=1}^{N} |q_i - (Rp_i + T)|^2,$$

where L represents the function value of the objective function, pi represents a feature point in the reference frame, qi represents a feature point in the current frame, and N represents the number of feature points.

In some embodiments, the UAV body is also equipped with a storage unit; the storage unit is connected with the control unit and the computing unit and the computing unit, which is configured for storing the constructed map model.

In some embodiments, the system further includes one or more positioning UAVs, and a fixing device arranged on the one or more positioning UAVs for keeping the one or more UAVs in a stable state.

In some embodiments, the fixing device includes a support arm and/or a fixing arm, and the support arm and/or the fixing arm are/is rotationally connected with bodies of the one or more positioning UAVs.

In some embodiments, the system further includes an auxiliary UAV, and the auxiliary UAV is provided with a lighting device.

Another aspect of some embodiment of the present disclosure provides a non-transitory computer readable storage medium storing a set of instructions, when executed by at least one processor, causing the at least one processor to perform the method for modelling a poor texture tunnel based on a vision-lidar coupling.

In some embodiments of the present disclosure, the SLAM mapping is carried out by integrating the depth camera and the lidar and fully utilizing the wide range information of the lidar and the abundant local information of the depth camera, so that the accuracy of the information is complementarily improved, and the construction of the map model is closer to the real tunnel environment. The Bayesian fusion method is used to fuse the point cloud information, the raster map, and the pose information to obtain a map model, which is suitable for uncertain information with additive Gaussian noise for obtaining the map model with smaller error. The rotation parameters and translation parameters are calculated by matching feature points between the latest map model and the previous map model, so as to correct the map model and further improve the accuracy of the map model. Moreover, with the assistance of the positioning UAVs and/or the auxiliary UAV in data collection, the accuracy of data collection is further improved, and accurate and reliable data is provided for the subsequent construction of map models.

BRIEF DESCRIPTION OF THE FIGURES

The present disclosure will be further explained by way of exemplary embodiments, which will be described in detail by the accompanying drawings. These embodiments are not restrictive, and in these embodiments, the same numbers indicate the same structures.

FIG. 3 is an exemplary flowchart for controlling an unmanned aerial vehicle (UAV) to obtain data according to some embodiments of the present disclosure.

DETAILED DESCRIPTION OF THE EMBODIMENTS

Figure 1:
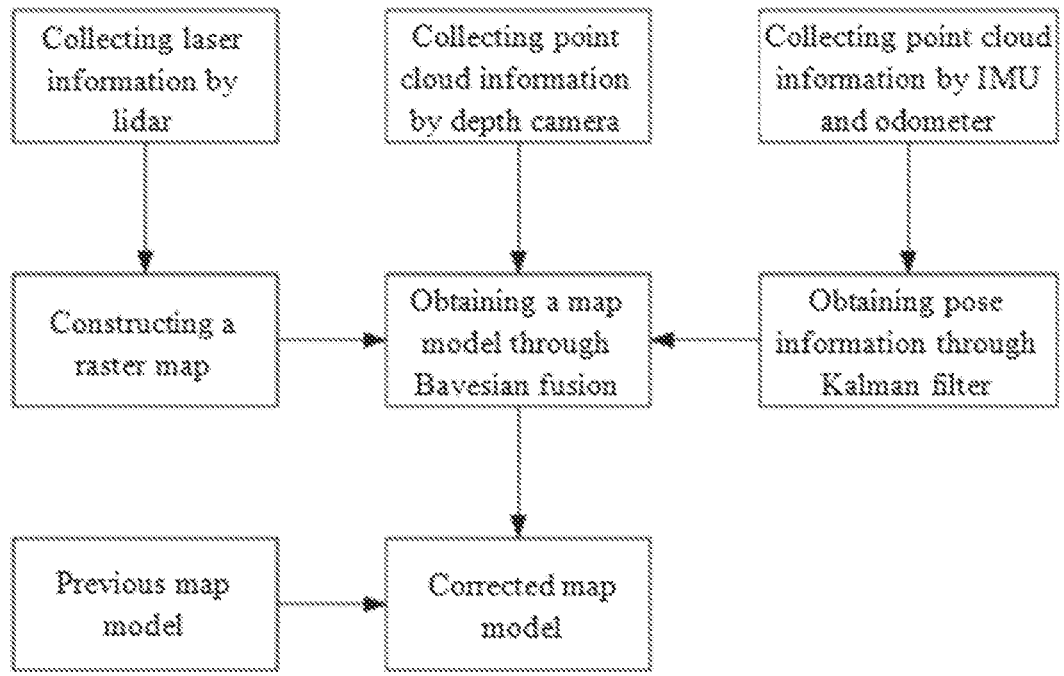
FIG. 1 is an exemplary flowchart of a method for modelling a poor texture tunnel based on a vision-lidar coupling according to some embodiments of the present disclosure.

In order to explain the technical scheme of the embodiment of the present disclosure more clearly, the following will briefly introduce the drawings that need to be used in the embodiment description. Obviously, the drawings in the following description are only some examples or embodiments of the present disclosure. For those of ordinary skill in the art, the present disclosure may also be applied to other similar situations according to these drawings without any creative effort. Unless it is obvious from the linguistic environment or otherwise stated, the same reference numerals in the figure represent the same structures or operations.

It should be understood that "system", "device", "unit" and/or "module" as used herein is a method for distinguishing different components, elements, parts, portions or assemblies at different levels. However, if other words may achieve the same purpose, they may be replaced by other expressions.

As shown in the present disclosure and claims, unless the context clearly indicates exceptional circumstances, words such as "a", "one", "a" and/or "the" are not specifically singular, but may also include plural. Generally speaking, the terms "including" and "containing" only imply the inclusion of clearly identified steps and elements, but these steps and elements do not constitute an exclusive list, and methods or devices may also contain other steps or elements.

Flowcharts are used in the present disclosure to explain the operations performed by the system according to the embodiment of the present disclosure. It should be understood that the preceding or following operations are not necessarily performed exactly in order. On the contrary, the steps may be processed in reverse order or simultaneously. At the same time, other operations may be added to these processes, or one or more operations may be removed from these processes.

Some embodiments of the present disclosure provide a system for modelling a poor texture tunnel based on a vision-lidar coupling. The system includes an unmanned aerial vehicle (UAV) body equipped with a depth camera, a lidar, a computing unit, and a controller, and the controller is in communication connection with the depth camera, the lidar and the computing unit. The system adopts a method for modelling a poor texture tunnel based on a vision-lidar coupling and models by the UAV equipped with the depth camera and the lidar. The process of the method, as shown in FIG. 1, includes following steps.

S1, obtaining point cloud information collected by the depth camera, laser information collected by the lidar and motion information of the UAV.

S2, generating a raster map through filtering the laser information and obtaining pose information of the UAV based on the motion information.

S3, obtaining a map model through fusing the point cloud information, the raster map, and the pose information by a Bayesian fusion method.

S4, obtaining a new map model by repeating the S1 to the S3, correcting a latest map model by feature matching based on a previous map model, and repeating S4 until completing construction of the map model.

The UAV body is also equipped with a storage unit, the storage unit is connected with a control unit and the computing unit, which is configured for storing the constructed map model.

The Lidar has advantages of high accuracy, good stability, and wide range of information, but the obtained data information is not rich enough. A vision sensor has advantages of low price, light weight, rich environmental information, and easy data association, but it has the disadvantage of poor depth estimation ability. Because the vision sensor is sensitive to lighting changes or low texture environment, in the environment lacking lighting and texture features, visual SLAM performs poorly, and even can't complete the task. Since laser SLAM and visual SLAM have certain limitations when used alone, the present disclosure integrates them for mapping, and uses depth camera and lidar for mapping to make up for their respective shortcomings. Finally, the accuracy and robustness of SLAM mapping are improved and the accuracy and the speed of mapping are improved.

Figure 2:
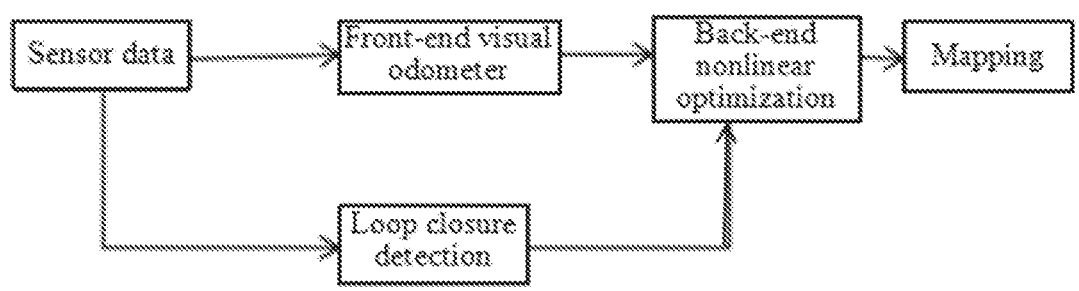
FIG. 2 is an exemplary schematic diagram of a framework of simultaneous localization and mapping (SLAM) according to some embodiments of the present disclosure.

Taking the visual SLAM as an example, a framework of the SLAM is shown in FIG. 2: sensor data→front-end visual odometer→back-end nonlinear optimization→loop closure detection→mapping. The sensor data is the received data, which is mainly image information in the visual SLAM. The task of the front-end visual odometer is to calculate the motion information of the camera from the obtained image information according to the image information at the adjacent time and construct a local map. The back-end nonlinear optimization is mainly to reduce the error of the map constructed by the visual odometer. The loop closure detection determines whether a position has been reached before, which mainly solves a drift of position estimation with time.

Because the positions of the depth camera and the lidar are different and the collected point cloud information and laser information are in different coordinate systems, so it is necessary to change coordinates to unify the coordinates. Before the UAV flies, a relative transformation relationship of coordinates may be determined by calibration. According to a position relationship between the depth camera and the lidar on the UAV, the relative transformation relationship between the point cloud information and the laser information is determined.

The transformation relationship of point cloud from a lidar coordinate system to a depth camera coordinate system is as follows:

$$\begin{pmatrix} X_c \\ Y_c \\ Z_c \end{pmatrix} = r \begin{pmatrix} X \\ Y \\ Z \end{pmatrix} + t,$$

$$\begin{pmatrix} u \\ v \\ 1 \end{pmatrix} = K \begin{pmatrix} \frac{X_c}{Z_c} \\ \frac{Y_c}{Z_c} \\ 1 \end{pmatrix},$$

where $(X, Y, Z)^T$ represents coordinates in the lidar coordinate system, $(Xc, Yc, Yc)^T$ represents coordinates in the depth camera coordinate system, $(u, v, 1)^T$ represents pixel coordinates on an imaging plane of the depth camera, r is a rotation matrix determined based on positions of the depth camera and the lidar on the UAV, t is a translation matrix determined based on the positions of the depth camera and the lidar on the UAV, and K represents an intrinsic parameter matrix of the depth camera, which is a fixed value.

The motion information of the UAV including a speed, an acceleration, and a distance, is measured by an inertial measurement unit (IMU) and an odometer. Because GPS signals in the tunnel are weak or even lost, a pose information of the UAV is obtained through fusing the motion information by Kalman filter based on the motion information measured by the IMU and the odometer.

Bayesian estimation is a statistical data fusion algorithm based on the condition or posterior probability of Bayes theorem. It is suitable for uncertain information with additive Gaussian noise to estimate an n-dimensional vector in an unknown state through a known vector. The present disclosure considers the point cloud information collected by the depth camera, the raster map constructed based on the lidar, and the pose information obtained based on moving camera and obtains the map model by Bayesian fusion. Moreover, the present disclosure comprehensively considers the advantages and disadvantages of the depth camera and the lidar and fuses the motion of the UAV to further reduce the error.

In S4, correcting a latest map model by feature matching based on a previous map model specifically includes:

S41, obtaining the previous map model as a reference frame; obtaining the latest map model, and finding an area corresponding to the previous map model from the latest map model as a current frame;

S42, denoting feature points in the reference frame by {Pi}, and denoting feature points in the current frame by {Qi}, and a number of feature points in the current frame is the same as that in the reference frame;

S43, constructing an inter-frame change model:

{Qi}=R{Pi}+T, where R represents a rotation parameter and T represents a translation parameter;

S44, substituting the feature points in the reference frame and the feature points in the current frame, and iteratively calculating the rotation parameters and the translation parameters; and S45, obtaining a matching relationship between the previous map model and the latest map model based on the rotation parameters and the translation parameters, and correcting the latest map model based on the matching relationship.

Because the map models are constructed during the flight of the UAV, there must be errors in the map models constructed at two times. Theoretically, if the rotation parameters and translation parameters are accurate, then every feature point in the reference frame will coincide with the feature point in the current frame. However, considering the presence of noise and errors, it is impossible to achieve 100% coincidence, so an objective function is defined. In the S44, iteratively calculating the rotation parameters and the translation parameters specifically includes:

substituting the feature points in the reference frame and the feature points in the current frame into the inter-frame change model, establishing an objective function based on the inter-frame change model, and defining a function value of the objective function as a minimum rotation parameter and a minimum translation parameter, which are the final calculated rotation parameter and translation parameter; a formula of the objective function is:

$$L = \sum_{i=1}^{N} |q_i - (Rp_i + T)|^2,$$

where L represents the function value of the objective function, pi represents a feature point in the reference frame, $q_i$ represents a feature point in the current frame, and N represents the number of feature points.

In some embodiments, the motion information of the UAV may also include positioning information determined based on reference signals sent by one or more positioning UAVs. The positioning UAVs may be used to provide positioning assistance for the UAV when the UAV collects data (for example, the point cloud data, the laser information). For example, the positioning UAVs may provide a distance reference when the UAV collects the point cloud information, so that the distance information contained in the point cloud information collected by the UAV may be more accurate.

The reference signals may be sent by the positioning UAVs and received by the UAV equipped with the depth camera. The UAV (generally referred to as the UAV equipped with the depth camera to collect data in the present disclosure) may determine the distance between the UAV and the positioning UAV according to a positioning signal, and then provide a reference for determining a distance between the UAV and other places based on the distance. In some embodiments, the reference signals may include all kinds of signals that may be sent/received by the UAVs and may be used for positioning, for example, wireless local area network signals composed of wireless access points, Bluetooth signals, ultra-wideband technology signals, radio frequency wireless signals, ZigBee signals, ultrasonic signals, infrared signals, and optical flow sensing signals.

The positioning information may refer to position information of the positioning UAVs sending out the reference signal. In some embodiments, a position in the position information may be a known position in advance. For example, one or more positioning UAVs are dispatched to a plurality of known positions, and each UAV corresponds to one position. Based on a corresponding relationship between each positioning UAV and each position, the position information corresponding to the reference signal may be determined. In some embodiments, the known positions may be determined according to the constructed map model, for example, one or more positions are designated as known positions from the map model.

In some embodiments, there are at least two positioning UAVs, so that a UAV may more accurately determine its own position based on the positioning signals of the at least two positioning UAVs.

In some embodiments, due to the existence of poor texture in the tunnel (for example, the wall surface is smooth due to the lack of tunnel texture), the SLAM algorithm may be inaccurate for determining the feature points of the depth image frames, which leads to low matching reliability of the feature points in the previous frame (for example, time t) and the next frame (for example, time t+1) in the depth image collected by the depth camera of the UAV, resulting in an inaccurate final positioning result. In some embodiments, the feature points may refer to some pixels in the image frame that may show an obvious difference compared with other pixels. For example, the value of most pixel points in the image frame is 100, and the value of some pixel points is 200, so these pixel points have a difference of 100. Moreover, these points with a pixel value of 200 have an obvious feature in the image, such as a bulge, which may be called feature points.

In some embodiments, the processing equipment may use a matching reliability to measure the reliability of processing a certain image frame using the SLAM algorithm and determine whether it is necessary to dispatch a positioning UAV for auxiliary positioning according to the matching reliability. For example, when the matching reliability is low (for example, lower than a preset threshold), it is necessary to dispatch a positioning UAV to assist in positioning when a UAV collects data. The threshold of matching reliability may be set manually, for example, 0.9, 0.8, 0.75, etc. When the matching reliability is lower than the preset threshold, it may be considered that there may be a big error in matching and positioning directly based on the feature points in the image frame at this time. Therefore, it is necessary to send instructions to the positioning UAV, and the positioning UAV will send out reference signals for auxiliary positioning.

In some embodiments, the processing equipment may determine the matching reliability based on the difference between the feature point and the adjacent pixel point. The adjacent pixel point may refer to a pixel point, the position of which is mutual adjacent to the position of the feature point in the image frame, such as direct adjacency and indirect adjacency. For example, there is an interval of 0 pixel point, or an interval of 1-3 pixel points, etc., between the position of the adjacent pixel point and the position of the feature point. Among them, the interval of 0 pixel point is called direct adjacency, and the interval of more than 1 pixel point is called indirect adjacency.

In some embodiments, the processing equipment may directly calculate the differences between the feature points and the adjacent pixel points, and determine the matching reliability based on the size of the differences. For example, the processing equipment may obtain difference values by sequentially subtracting the values of adjacent pixel points from the pixel values of feature points. The processing equipment may average for the difference values between a plurality of feature points and adjacent pixel points, and the average value obtained after averaging may be used as the difference value between the feature points and adjacent pixel points. At this time, the matching reliability may be directly negatively correlated with the difference value. For example, the greater the difference value is, the more prominent the feature point is in the image frame, and the higher the matching reliability is.

In some embodiments, the processing equipment may determine the matching reliability based on a reliability prediction model. For example, the processing equipment may input the image frame into the reliability prediction model for processing, the reliability prediction model outputs the feature point in the image frame and a corresponding confidence level after the reliability prediction model processes the image frame, and the processing equipment may determine the matching reliability according to the confidence level. For example, the confidence level may be positively correlated with the matching reliability, and the greater the confidence level is, the higher the matching reliability is.

In some embodiments, the model structure of the reliability prediction model may include a convolutional neural network and a deep learning network. The convolutional neural network may be used to convolute the input image frame to obtain feature information, and the deep learning network may process the feature information obtained by the convolutional neural network to determine the feature point and the corresponding confidence level in the image frame. The input of the reliability prediction model is a single-frame image, and the output is the feature point and the corresponding confidence level in the image frame.

In some embodiments, the processing equipment may train an initial reliability prediction model through a training sample set to obtain the reliability prediction model. Each training sample in the training sample set may include a sample image and a corresponding label, and the label includes the feature point and the corresponding confidence level in the sample image. In some embodiments, the label may be obtained by manual labeling, and the feature point may be determined based on related algorithms, for example, the algorithm disclosed in the embodiment of the present disclosure that may be used to determine feature points. The confidence level may be determined based on the capturing environment of the image, for example, the image captured in a tunnel with normal modelling data may be taken as a sample with a high confidence level, and the confidence level corresponding to the feature point in the sample image is 1 (or a value close to 1); the image captured in a tunnel with obvious poor texture is taken as a sample with a low confidence level, and the confidence level corresponding to the feature point in the sample image is 0 (or a value close to 0).

In this embodiment, the purposes of improving the positioning accuracy of the target UAV may be achieved by controlling the positioning UAV for auxiliary positioning based on the matching reliability. At the same time, it may avoid dispatching the positioning UAVs without needs of the assistance of the positioning UAV, so as to effectively and reasonably utilize resources of the positioning UAVs.

In some embodiments, in order to improve the stability of the body of the positioning UAVs when the positioning UAVs send out reference signals, a fixing device may be arranged on the positioning UAVs, and the fixing device may be used to keep the stability of the positioning UAVs when the position UAVs send out positioning signals.

In some embodiments, the fixing device may include a support arm and/or a fixing arm, and the support arm and/or the fixing arm are/is rotationally connected with the body of the positioning UAVs. For example, the fixing device may be connected with the body of the positioning UAV through various rotatable mechanical structures (for example, hinges, etc.). The present disclosure does not limit the specific way of rotating connection. The support arm may be used to improve the stability of the positioning UAVs when it is parked on a plane (for example, the ground), and the fixing arm may be used to improve the stability of the positioning UAV when it is parked on a side (for example, the wall inside the tunnel). The support arm and the fixing arm may be realized by various common mechanical structures, which are not limited in the present disclosure.

In some embodiments, due to insufficient lighting conditions in the tunnel, the quality of depth images obtained by the UAV when collecting point cloud information may be poor. In order to improve the quality of obtained depth images, when the UAV uses the depth camera to collect point cloud information, an auxiliary UAV may be used to light the collection environment, so as to provide better environmental conditions for data collection.

Image quality, such as image clarity, image brightness, image contrast, etc., may reflect the quality of images captured by the UAV in the tunnel.

In some embodiments, the processing equipment may determine whether to use the auxiliary UAV for lighting according to the image quality of the depth images collected by the depth camera of the current UAV. When the image quality of the depth images is good (for example, when the image quality is greater than a preset image quality threshold), there is no need to use the auxiliary UAV for lighting. When the image quality of the depth images is low (for example, the image quality is less than the preset image quality threshold), the auxiliary UAV may be used for lighting.

In some embodiments, the processing equipment may determine the image quality based on a preset image quality algorithm, for example, the image quality may be determined according to the calculation result calculated by an algorithm based on a gray value. The calculation result may be positively correlated with the image quality, and the better the gray value of the image is, the higher the image quality is.

In some embodiments, the processing equipment may also determine the image quality based on an image quality prediction model. For example, the depth image captured by the UAV is input into the image quality prediction model for processing, and the image quality is determined according to the processing result. Specifically, the processing equipment may input the depth image into the image quality prediction model, and the image quality prediction model determines the image quality and outputs it according to the recognition results of various objects (e.g., rocks, etc.) in the depth image. The output form may be a numerical value between 0 and 1. The closer the numerical value is to 1, the higher the image quality is.

In some embodiments, the processing equipment may train an initial image quality prediction model based on a training sample set to obtain the image quality prediction model. Among them, each training sample in the training sample set includes a sample depth image and its corresponding label, the label is a value between 0 and 1, and the label may be directly obtained by manual labeling. The sample depth image may be obtained from historical depth images collected by the UAV.

In some embodiments, the model structure of the image quality prediction model may include a convolutional neural network and a deep learning network.

In this embodiment, the auxiliary UAV is controlled for lighting based on whether the image output by the image quality prediction model can be correctly identified. Furthermore, lighting parameters of the auxiliary UAV may also be determined based on the output value of the image quality prediction model. For example, the lower the output value is, the worse the image quality is, and the worse the light condition is, so the greater the intensity of the required auxiliary lighting is. Lighting by the auxiliary UAV may effectively improve the environmental condition of data collected by the UAV, thus improving the quality of depth image collected by the depth camera and reducing the final result error caused by image quality.

In some embodiments, the auxiliary UAV may use various lighting equipment for lighting, such as searchlights, etc., which are not limited in the present disclosure.

In some embodiments, in order to further improve the quality of the constructed map model, the UAV may be controlled to obtain new data, such as point cloud data, laser information and motion information, based on the determined data quality.

FIG. 3 is an exemplary flowchart for controlling an UAV to obtain data according to some embodiments of the present disclosure. In some embodiments, a process 300 may be performed by processing equipment. For example, the process 300 may be stored in a storage device (such as a self-contained storage unit or an external storage device of processing equipment) in a form of a program or instruction, when executed by the processing equipment, the process 300 may be realized. The process 300 may include the following steps.

S302, determining data quality of data corresponding to each preset area in the tunnel through processing the point cloud information, the laser information, and the motion information by a data quality judgment model.

In some embodiments, the processing equipment may input the point cloud information, laser information, and motion information obtained by the UAV into the data quality judgment model, and the data quality judgment model outputs the data quality of the data corresponding to each preset area in the tunnel. The data corresponding to each preset area includes the point cloud information, the laser information, and the motion information.

In some embodiments, the preset area may be obtained according to the constructed map model. For example, according to a certain proportion or a certain rule (for example, geographical structure type, etc.), each area in the tunnel is divided to obtain a plurality of preset areas.

In some embodiments, the data quality judgment model may be a deep learning model. The data quality judgment model may be trained based on a plurality of training samples, and each training sample may include sample point cloud information, sample laser information, and sample motion information, and the label is the data quality corresponding to the training sample. In some embodiments, the label may be represented by a multidimensional vector, and each element of the multidimensional vector may be used to represent the data quality of the data corresponding to the training sample in a certain dimension (e.g., image contrast, image brightness, laser energy, etc.). For example, an exemplary label may be represented as [1, 0.8, 1], the first 1 indicates that the data quality of the data in image contrast is 1, 0.8 indicates that the data quality of the data in image brightness is 0.8, and the second 1 indicates that the data quality of the data in laser energy is 1.

In some embodiments, the processing equipment may obtain a data quality judgment model by training using various common methods, such as gradient descent method, which are not limited in the present disclosure.

S304, controlling the UAV to obtain the data based on the data quality and the constructed map model.

If the data quality of a certain area is relatively low, and the performance of the constructed map model is not good enough, an UAV may be dispatched to the area to collect some data correspondingly, so as to improve the model construction of the corresponding part of the map model.

In some embodiments, the processing equipment may determine an area where the UAV needs to be controlled to continue to collect data according to the data quality, compare the area with the constructed map model, and determine collection parameters when the UAV is controlled to obtain data according to the constructed map model.

In some embodiments, the collection parameters may include a UAV type, whether a positioning UAV and an auxiliary UAV are used, parameters of the depth camera and the lidar during data collection, etc. The types of the UAVs may include large UAVs or small UAVs. For example, when the space in the area where data needs to be collected is small, it is more appropriate to use small UAVs to collect data.

In some embodiments, when the UAV is used to obtain data, the auxiliary UAV may be used to light the collection environment, and one or more positioning UAVs may be used to send out reference signals, so that the UAV may obtain data with higher data quality.

It should be noted that the above description of each process is only for example and explanation, and does not limit the scope of disclosure of the present disclosure. For those skilled in the art, under the guidance of the present disclosure, various modifications and changes may be made to the process. However, these modifications and changes are still within the scope of the present disclosure. For example, changes to the process steps in the present disclosure, such as adding pretreatment steps and storage steps, etc.

Having described the basic concepts above, it is obvious to those skilled in the art that the above detailed disclosure is only an example, and does not constitute a limitation on the present disclosure. Although not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. Such as "one embodiment", "an embodiment" and/or "some embodiments" mean a certain feature, structure or characteristic related to at least one embodiment of the present disclosure. Therefore, it should be emphasized and noted that "an embodiment" or "one embodiment" or "one alternative embodiment" mentioned twice or more in different places in the present disclosure do not necessarily mean the same embodiment. In addition, some features, structures or features in one or more embodiments of the present disclosure may be combined appropriately.

In addition, those skilled in the art may understand that all aspects of the present disclosure may be illustrated and described by several patentable categories or situations, including any new and useful processes, machines, products or combinations of substances, or any new and useful improvements to them. Accordingly, various aspects of the present disclosure may be completely executed by hardware, software (including firmware, resident software, microcode, etc.), or a combination of hardware and software. All the above hardware or software may be called "block", "module", "engine", "unit", "component" or "system". In addition, aspects of the present disclosure may be represented as computer products in one or more computer-readable media, and the products include computer-readable program codes.

A computer storage medium may contain a propagated data signal containing computer program code, such as on baseband or as part of a carrier wave. The propagated signal may have various forms, including electromagnetic form, optical form, etc., or suitable combination forms. The computer storage medium may be any computer-readable medium except the computer-readable storage medium. The computer storage medium may realize communication, propagation or transmission of programs for use by connecting to an instruction execution system, device or equipment. The program code on the computer storage medium may be propagated through any suitable medium, including radio, cable, fiber optic cable, RF, or similar media, or the combination of any of the above media.

The computer program codes required for each part of the present disclosure may be written in any one or more programming languages, including object-oriented programming languages such as Java, Scala, Smalltalk, Eiffel, JADE, Emerald, C++, C#, VB.NET, Python, conventional programming languages such as C language, Visual Basic, Fortran 2003, Perl, COBOL2002, PHP, ABAP, dynamic programming languages such as Python, Ruby and Groovy, or other programming languages, etc. The program code may run completely on the user's computer, or as an independent software package on the user's computer, or partially on the user's computer and partially on the remote computer, or completely on the remote computer or server. In the latter case, the remote computer may be connected to the user's computer through any network form, such as a local area network (LAN) or a wide area network (WAN), or connected to an external computer (for example, through the Internet), or in a cloud computing environment, or used as a service such as software as a service (SaaS).

In addition, unless explicitly stated in the claims, the order of processing elements and sequences, the use of numerals and letters, or other names mentioned in the present disclosure are not used to limit the order of the flow and method of the present disclosure. Although some presently considered useful embodiments of the disclosure have been discussed through various examples in the above disclosure, it should be understood that such details are for the purpose of illustration only, and the appended claims are not limited to the disclosed embodiments. On the contrary, the claims are intended to cover all modifications and equivalent combinations that conform to the spirit and scope of the embodiments of the present disclosure. For example, although the above-described system components may be realized by hardware devices, they may also be realized only by software solutions, such as installing the described system on an existing server or mobile device.

Similarly, it should be noted that, in order to simplify the expression disclosed in the present disclosure, and help to understand one or more embodiments of the invention, in the foregoing description of embodiments of the present disclosure, sometimes various features are combined into one embodiment, one drawing or descriptions thereof. However, this disclosure method does not mean that the features required by the object of the present disclosure are more than those mentioned in the claims. Actually, the features of the embodiment are less than all the features of the single embodiment disclosed above.

In some embodiments, numbers describing the number of ingredients and attributes are used. It should be understood that such numbers used in the description of embodiments are modified by modifiers "about", "approximately" or "substantially" in some examples. Unless otherwise stated, "about", "approximately" or "substantially" means that the number is allowed to vary by ±20%. Accordingly, in some embodiments, the numerical parameters used in the present disclosure and claims are approximate values, and the approximate values may be changed according to the required characteristics of individual embodiments. In some embodiments, the specified significant digits should be taken into account for the numerical parameters, and the general digit reservation method should be adopted. Although in some embodiments of the present disclosure, the numerical fields and parameters used to confirm the range breadth are approximate values, in specific embodiments, the setting of such numerical values is as accurate as possible within the feasible range.

For each patent, patent application, publication of patent application, and other materials cited in the present disclosure, such as articles, books, specifications, publications, documents, etc., the entire contents are hereby incorporated into the present disclosure as a reference. Excepting the disclosure history documents that are inconsistent or conflict with the contents of the present disclosure, and the documents that restrict the widest scope of the claims of the present disclosure (currently or later attached to the present disclosure). It should be noted that if there is any inconsistency or conflict between the descriptions, definitions, and/or terms used in the supplementary materials of the present disclosure and the contents of the present disclosure, the descriptions, definitions, and/or terms used in the present disclosure shall prevail.

Finally, it should be understood that the embodiments described in the present disclosure are only used to illustrate the principles of the embodiments of the present disclosure. Other variations may also fall within the scope of the present disclosure. Therefore, by way of example and not limitation, alternative configurations of embodiments of the present disclosure may be regarded as consistent with the teachings of the present disclosure. Accordingly, the embodiments of the present disclosure are not limited to those explicitly introduced and described in the present disclosure.

What is claimed is:

1. A method for modelling a poor texture tunnel based on a vision-lidar coupling, which is modelled using an unmanned aerial vehicle (UAV) equipped with a depth camera and a lidar, comprising:
S1, obtaining point cloud information collected by the depth camera, laser information collected by the lidar, and motion information of the UAV;
S2, generating a raster map through filtering the laser information and obtaining pose information of the UAV based on the motion information;
S3, obtaining a map model through fusing the point cloud information, the raster map, and the pose information by a Bayesian fusion method; and
S4, obtaining a new map model by repeating the S1 to the S3, correcting a latest map model by feature matching based on a previous map model,
wherein in the S4, the correcting a latest map model by feature matching based on a previous map model includes:
S41, obtaining the previous may model as a reference frame, obtaining the latest map model, and finding an area corresponding to the previous map model from the latest may model as a current frame;
S42, denoting feature points in the reference frame by $\{P_i\}$, and denoting feature points in the current frame by $\{Q_i\}$, and a number of feature points in the current frame being the same as that in the reference frame;
S43, constructing an Inter-frame change model;

$\{Q_i\}=R\{P_i\}+T$, where R represents a rotation parameter and T represents a translation parameter;
S44, substituting the feature points in the reference frame and the feature points in the current frame, and iteratively calculation the rotation parameters and the translation parameters; and
S45, obtaining a matching relationship between the previous map model and the latest map model based on the rotation parameters and the translation parameters, and correcting the latest mac model based on the matching relationship;
wherein in the S44, the iteratively calculating the rotation parameters and the translation parameters includes:
substituting the feature points in the reference frame and the feature points in the current frame into the inter-frame change model, establishing an objective function based on the inter-frame change model, and defining a function value of the objective function as a minimum rotation parameter and a minimum translation parameter, which are the final calculated rotation parameter and translation parameter; wherein a formula of the objective function is:

$$L = \sum_{i=1}^{N} |q_i - (Rp_i + T)|^2,$$

where L represents the function value of the objective function, $p_i$ represents a feature point in the reference frame, $q_i$ represents a feature point in the current frame, and N represents the number of feature points.

2. The method for modelling the poor texture tunnel based on the vision-lidar coupling according to claim 1, the method further comprising:
Before the S1, determining a relative transformation relationship between the point cloud information and the laser information according to a position relationship between the depth camera and the lidar on the UAV.

3. The method for modelling the poor texture tunnel based on the vision-lidar coupling according to claim 2, wherein a transformation relationship of point cloud from a lidar coordinate system to a depth camera coordinate system is as follows:

$$\begin{pmatrix} X_c \\ Y_c \\ Z_c \end{pmatrix} = r \begin{pmatrix} X \\ Y \\ Z \end{pmatrix} + t,$$

-continued $$\begin{pmatrix} u \\ v \\ 1 \end{pmatrix} = K \begin{pmatrix} \frac{X_c}{Z_c} \\ \frac{Y_c}{Z_c} \\ 1 \end{pmatrix},$$

where $(X, Y, Z)^T$ represents coordinates in the lidar coordinate system, $(X_c, Y_c, Y_c)^T$ represents coordinates in the depth camera coordinate system, $(u, v, 1)^T$ represents pixel coordinates on an imaging plane of the depth camera, r is a rotation matrix determined based on positions of the depth camera and the lidar on the UAV, t is a translation matrix determined based on the positions of the depth camera and the lidar on the UAV, and K represents an intrinsic parameter matrix of the depth camera.

4. The method for modelling the poor texture tunnel based on the vision-lidar coupling according to claim 1, wherein
the motion information of the UAV includes a speed, an acceleration, and a distance, which is measured by an inertial measurement unit (IMU) and an odometer; and
in the S2, the pose information of the UAV is obtained through fusing the motion information by Kalman filter.

5. The method for modelling the poor texture tunnel based on the vision-lidar coupling according to claim 1, wherein the motion information includes positioning information determined based on reference signals sent by one or more positioning UAVs.

6. The method for modelling the poor texture tunnel based on the vision-lidar coupling according to claim 5, further comprising:
before obtaining the reference signal,
determining a matching reliability of the depth image based on a difference between feature points and adjacent pixel points in a depth image collected by the depth camera; and
controlling the reference signals sent by the one or more positioning UAVs based on the matching reliability.

7. The method for modelling the poor texture tunnel based on the vision-lidar coupling according to claim 5, wherein when the reference signal is sent by the one or more positioning UAVs, the one or more positioning UAVs is kept in a stable state by a fixing device arranged on the one or more positioning UAVs.

8. The method for modelling the poor texture tunnel based on the vision-lidar coupling according to claim 1, further comprising:
when the point cloud information is collected by the depth camera, lighting a collection environment using an auxiliary UAV.

9. The method for modelling the poor texture tunnel based on the vision-lidar coupling according to claim 1, further comprising:
determining data quality of data corresponding to each preset area in the tunnel through processing the point cloud information, the laser information, and the motion information by a data quality judgment model; and
controlling the UAV to obtain the data based on the data quality and the constructed map model.

10. The method for modelling the poor texture tunnel based on the vision-lidar coupling according to claim 9, wherein the controlling the UAV to obtain the data based on the data quality and the constructed map model includes:
when the data is obtained using the UAV, lighting a collection environment using an auxiliary UAV; and
sending out reference signals using one or more positioning UAVs.

11. A system for modeling a poor texture tunnel based on a vision-lidar coupling comprising an unmanned aerial vehicle (UAV) body equipped with a depth camera, a lidar, a computing unit, and a controller, the controller is in communication connection with the depth camera, the lidar, and the computing unit, and the system performs following steps during a flight of the UAV:
T1, obtaining point cloud information collected by the depth camera, laser information collected by the lidar, and motion information of the UAV, and sending the point cloud information, laser information, and motion information to the computing unit by the controller;
T2, generating a raster map through filtering the laser information and obtaining pose information of the UAV based on the motion information by the computing unit;
T3, obtaining a map model through fusing the point cloud information, the raster map, and the pose information by a Bayesian fusion method; and
T4, obtaining a new map model by repeating the T1 to the T3, correcting a latest map model by feature matching based on a previous map model,
wherein in the T4, the correcting a latest map model by feature matching based on a previous map model includes:
T41, obtaining the previous map model as a reference frame, obtaining the latest map model, and finding an area corresponding to the previous map model from the latest map model as a current frame;
T42, denoting feature points in the reference frame by $\{P_i\}$, and denoting feature points in the current frame by $\{Q_i\}$, and a number of feature points in the current frame being the same as that in the reference frame;
T43, constructing an inter-frame change model:

$\{Q_i\}=R\{P_i\}+T$, whom R represents a rotation parameter and T represents a translation parameter;
T44, substituting the feature points in the reference frame and the feature points in the current frame, and iteratively calculating the rotation parameters and the translation parameters; and
T45, obtaining a matching relationship between the previous mat model and the latest map model based on the rotation parameters and the translation parameters, and correcting the latest map model based on the matching relationship;
wherein in the T44, the iteratively calculating the rotation parameters and the translation parameters includes:
substituting the feature points in the reference frame and the feature points in the current frame into the inter-frame change model, establishing an objective function based on the inter-frame change model, and defining a function value of the objective function as a minimum rotation parameter and a minimum translation parameter, which is the final calculated rotation parameter and translation parameter, wherein a formula of the objective function is:

$$L = \sum_{i=1}^{N} |q_i - (Rp_i + T)|^2,$$

where L represents the function value of the objective function, $p_i$ represents a feature point in the reference frame, $q_i$ represents a feature point in the current frame, and N represents the number of feature points.

12. The system for modelling the poor texture tunnel based on the vision-lidar coupling according to claim 11, wherein the UAV body is further equipped with a storage unit, the storage unit is connected with the control unit and the computing unit, which is configured for storing the constructed map model.

13. The system for modelling the poor texture tunnel based on the vision-lidar coupling according to claim 11, further comprising one or more positioning UAVs and a fixing device arranged on the one or more positioning UAVs for keeping the one or more UAVs in a stable state.

14. The system for modelling the poor texture tunnel based on the vision-lidar coupling according to claim 13, wherein the fixing device includes at least one of a support arm and a fixing arm, and the at least one of the support arm and the fixing arm is rotationally connected with bodies of the one or more positioning UAVs.

15. The system for modelling the poor texture tunnel based on the vision-lidar coupling according to claim 9, further comprising an auxiliary UAV, wherein the auxiliary UAV is provided with a lighting device.

16. A non-transitory computer readable storage medium storing a set of instructions, when executed by at least one processor, causing the at least one processor to perform a method for modelling a poor texture tunnel based on a vision-lidar coupling comprising:
S1, obtaining point cloud information collected by the depth camera, laser information collected by the lidar, and motion information of the UAV;
S2, generating a raster map by filtering the laser information and obtaining pose information of the UAV based on the motion information;
S3, obtaining a map model through fusing the point cloud information, the raster map, and the pose information by a Bayesian fusion method; and
S4, obtaining a new map model by repeating S1 to S3, correcting a latest map model by feature matching based on a previous map model,
wherein in the S4, the correcting a latest may model by feature matching based on a previous map model includes:
S41, obtaining the previous may model as a reference frame, obtaining the latest map model, and finding an area corresponding to the previous man model from the latest may model as a current frame;
S42, denoting feature points in the reference frame by $\{P_i\}$ and denoting feature points in the current frame by $\{Q_i\}$, and a number of feature points in the current frame being the same as that in the reference frame;
S43, constructing an inter-frame change model:

$$\{Q_i\}=R\{P_i\}+T,$$

where R represents a rotation parameter and T represents a translation parameter;
S44, substituting the feature points in the reference frame and the feature points in the current frame, and iteratively calculating the rotation parameters and the translation parameters; and
S45, obtaining a matching relationship between the previous mac model and the latest map model based on the rotation parameters and the translation parameters, and correcting the latest mac model based on the matching relationship;
wherein in the S44, the iteratively calculating the rotation parameters and the translation parameters includes:
substituting the feature points in the reference frame and the feature points in the current frame into the inter-frame change model, establishing an objective function based on the inter-frame change model, and defining a function value of the objective function as a minimum rotation parameter and a minimum translation parameter, which are the final calculated rotation parameter and translation parameter; wherein a formula of the objective function is:

$$L = \sum_{i=1}^{N} |q_i - (Rp_i + T)|^2,$$

where L represents the function value of the objective function, pi represents a feature point in the reference frame, qi represents a feature point in the current frame, and N represents the number of feature points.

* * * * *